(12) United States Patent
Ver Steeg et al.

(10) Patent No.: US 7,876,768 B2
(45) Date of Patent: Jan. 25, 2011

(54) SYSTEMS AND METHODS OF ASSEMBLING AN ELEMENTARY STREAM FROM AN ENCAPSULATED MULTIMEDIA TRANSPORT STREAM

(76) Inventors: William C. Ver Steeg, 330 Guildhall Grove, Alpharetta, GA (US) 30022; David B. Burleson, 3102 Barkley Square Dr., Duluth, GA (US) 30097

( * ) Notice: Subject to any disclaimer, the term of this patent is extended or adjusted under 35 U.S.C. 154(b) by 675 days.

(21) Appl. No.: 11/428,351

(22) Filed: Jun. 30, 2006

(65) Prior Publication Data
US 2008/0022321 A1 Jan. 24, 2008

(51) Int. Cl.
H04L 12/28 (2006.01)
H04L 12/66 (2006.01)
(52) U.S. Cl. ...................... 370/420; 370/463
(58) Field of Classification Search ............... 370/389; 725/151
See application file for complete search history.

(56) References Cited

U.S. PATENT DOCUMENTS

| | | | |
|---|---|---|---|
| 5,568,614 A * | 10/1996 | Mendelson et al. | 709/231 |
| 5,805,821 A * | 9/1998 | Saxena et al. | 709/231 |
| 5,959,659 A * | 9/1999 | Dokic | 725/152 |
| 6,246,683 B1 | 6/2001 | Connery | |
| 6,427,173 B1 | 7/2002 | Boucher et al. | |
| 7,039,048 B1 | 5/2006 | Monta et al. | |
| 2002/0023270 A1 * | 2/2002 | Thomas et al. | 725/95 |
| 2004/0125754 A1 * | 7/2004 | Johnson | 370/257 |
| 2006/0174032 A1 * | 8/2006 | Winchester et al. | 709/238 |
| 2008/0005776 A1 | 1/2008 | Ver Steeg | |
| 2008/0313687 A1 | 12/2008 | Rajakarunanayake | |

FOREIGN PATENT DOCUMENTS

| | | |
|---|---|---|
| WO | 0227519 A | 4/2002 |
| WO | WO 2007/064135 A1 | 6/2007 |

OTHER PUBLICATIONS

International Search Report on PCT/US07/072431 dated Feb. 14, 2008.
Woodsie C.M., et al., "The Protocol Bypass Concept for High Speed OSI Data Transfer," Protocols for High Speed Networks, Proceedings of the IFIP International Workshop, North Holland, Amsterdam, NL, Nov. 1990, pp. 1-16.
Salkintzis A.K.; Fitzek FHP; Seeling, P; Reisslein M.: "Mobile Internet, C. 11: Video Streaming in Wireless Internet" 2004, CRC Press, http://www.engnetbase.com.

(Continued)

*Primary Examiner*—Thai D Hoang
(74) *Attorney, Agent, or Firm*—Merchant & Gould

(57) ABSTRACT

Systems and methods of assembling an elementary stream from an encapsulated multimedia transport stream are disclosed. In one embodiment, the method is performed in a digital home communication terminal (DHCT). This method comprises the steps of: receiving a layer-2 packet through a binding to a network interface driver; applying at least one filter to the received packet to determine whether the received packet contains one or more multimedia transport packets meeting criteria associated with the filter; and for each multimedia transport packet meeting the applied filter criteria, copying the respective multimedia transport packet to an elementary stream buffer.

17 Claims, 6 Drawing Sheets

OTHER PUBLICATIONS

International Preliminary Report dated Jan. 6, 2009 cited in Application No. PCT/US2007/072431.

International Preliminary Report dated Feb. 2, 2010 cited in Application No. PCT/US2008/070691.

European Communication dated May 15, 2009 cited in Application No. 07 812 457.5 - 1522.

U.S. Office Action dated Mar. 25, 2010 cited in U.S. Appl. No. 11/829,309.

* cited by examiner

SYSTEMS AND METHODS OF ASSEMBLING AN ELEMENTARY STREAM FROM AN ENCAPSULATED MULTIMEDIA TRANSPORT STREAM

CROSS REFERENCE TO RELATED APPLICATIONS

Not applicable.

FIELD OF THE DISCLOSURE

The present disclosure relates to digital set-tops, and more specifically, to systems and methods of assembling an elementary stream from an encapsulated multimedia transport stream.

BACKGROUND

A growing number of consumers now have high-speed, or broadband, connections to the Internet in their homes. The increased bandwidth provided by these broadband connections allows the delivery of digital television and/or video services to home consumers. One such technology uses one or more protocols in the Internet Protocol (IP) family as a delivery mechanism. This technology is referred to as IP television, or IPTV.

The IP family of protocols uses a layered approach, with IP itself acting as the network-layer protocol. Sitting on top of the IP network layer is a transport layer such as TCP (Transmission Control Protocol) or User Data Protocol (UDP). The IP family also includes a variety of session-layer protocols above the transport-layer, such as Real-Time Transport Protocol (RTP) and Session Description Protocol (SDP). IPTV delivers video or television as a Motion Pictures Experts Group (MPEG) transport stream, carried by UDP/IP, or RTP/UDP/IP. Thus, a number of MPEG transport stream (TS) packets are encapsulated into each UDP or RTP packet.

By using the IP family of protocols to deliver an MPEG transport stream to a set-top, service providers can take advantage of the existing IP network infrastructure, which is substantial. However, the protocol layers that allow successful delivery of packets across the Internet can be a problem when processing the packet in the set-top. In a set-top using a conventional design, merely moving the constant stream of high-speed video packets up the layered protocol stack can consume a significant amount of processor time. This leaves little processor time for other tasks, such as transmitting packets or responding to user input. As a result, the user can experience a slow response time to set-top applications, for example, as when scrolling through an on-screen program guide. Thus, a need arises for these and other problems to be addressed.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

The embodiments disclosed herein provide systems and methods for assembling an elementary stream from an encapsulated multimedia transport stream in an IPTV environment. One such embodiment includes logic for assembling an elementary stream from an encapsulated multimedia transport stream, which receives layer-2 packets by binding to a network interface driver. This logic retrieves one or more multimedia transport stream packets which are encapsulated within the layer-2 packet and which meet various criteria, and writes the de-encapsulated transport stream packets to an elementary stream buffer. (Here, "multimedia" includes media types such as video and audio, and a person of ordinary skill in the art should understand that an elementary stream contains a single type of media.)

The logic examines various header fields in the received packets, including header fields at different layers, to determine whether the received packet contains encapsulated multimedia transport stream packets which meet specific criteria. These criteria are provided to the logic by a component such as a video playback application. Examples of such critieria include a destination IP address, a destination UDP port, and a transport stream program identifier.

Figure 1:
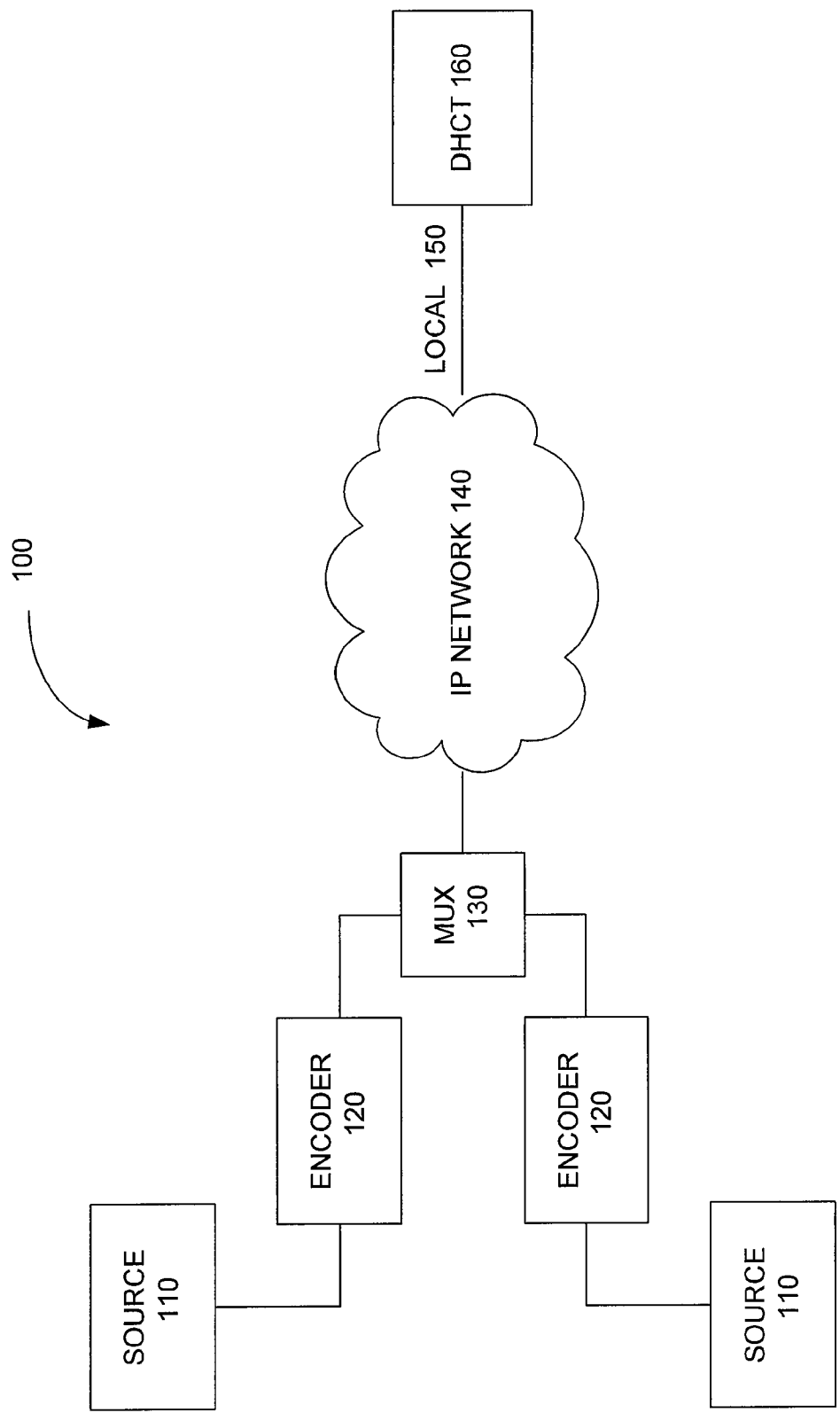
FIG. 1 is a block diagram of an environment in which one embodiment of a system and method for assembling an elementary stream from an encapsulated multimedia transport stream is located.

FIG. 1 is a block diagram of an environment in which one embodiment of a system and method for assembling an elementary stream from an encapsulated multimedia transport stream is located. System 100 delivers digital television and/or video services to subscribers using the Internet Protocol (IP). System 100 comprises: one or more broadcast sources 110; one or more broadcast encoders 120; a broadcast multiplexer 130; an IP network 140; a local connection 150; and a digital home communication terminal (DHCT) 160.

Broadcast sources 110, such as cable networks or on-air television stations, provide television or video programming. Broadcast encoders 120 take as input an analog signal digital stream from broadcast source 110, and output a stream that is compressed and formatted. Broadcast multiplexer 130 multiplexes encoded broadcast streams into a single stream.

The stream is transmitted through IP network 140, then over local connection 150 to DHCT 160, which converts the stream of IP packets into a standard analog or digital video signal. DHCT 160 supplies the video signal to a display (not shown) for viewing by the customer. In one embodiment, the display is a television. In another embodiment, the display is a computer monitor.

In some embodiments, DHCT 160 also provides interactive features, such as an electronic program guide (EPG), Web browser, e-mail, and DVR (digital video recorder) functionality. In some embodiments, DHCT 160 takes the form of a set-top box. In others, DHCT 160 is implemented by a personal computer (PC).

Figure 2:
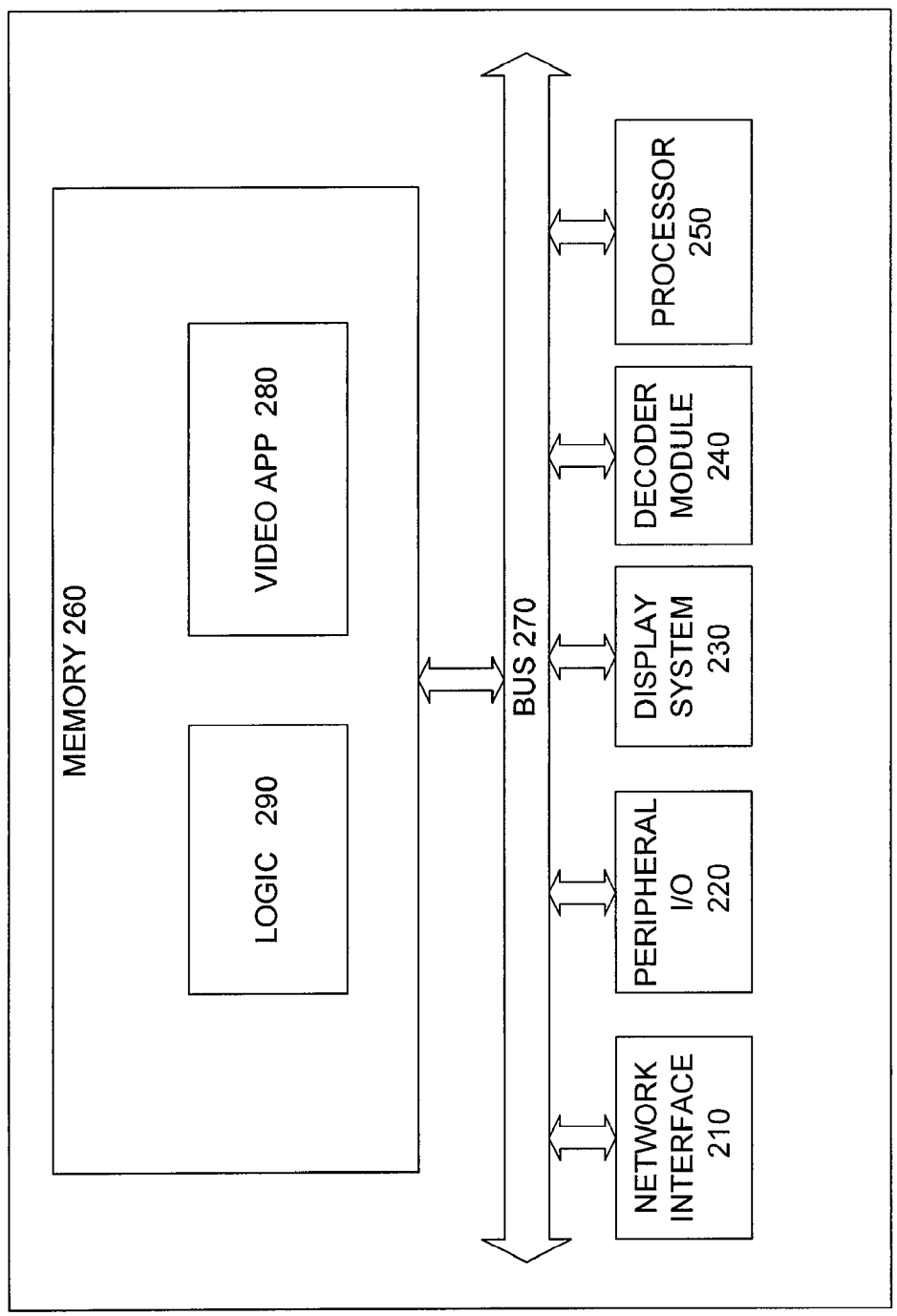
FIG. 2 is a block diagram showing selected components of a digital home communication terminal (DHCT) which implements one of the systems and methods of assembling an elementary stream from an encapsulated multimedia transport stream that is disclosed herein.

FIG. 2 is a block diagram showing selected components of a DHCT 160 which implements one of the systems and methods of assembling an elementary stream from an encapsulated multimedia transport stream disclosed herein. DHCT 160 comprises: a network interface 210; a peripheral I/O interface 220; a display system 230; a decoder module 240; a processor 250; and memory 260. These components are coupled by a bus 270.

Network interface 210 receives a stream of IPTV packets from local connection 150. Memory 260 contains instructions that are executed by processor 250 to control operations of DHCT 160. Residing in memory 260 is a video/television playback application 280. Video playback component 280 removes an MPEG stream that is encapsulated within the IPTV packets, and provides the MPEG stream to decoder module 240. Video playback component 280 allows a user to tune to a particular channel and watch a live broadcast, or to playback a program recorded to storage (not shown). Memory 260 also includes stream assembly logic 290. In this example embodiment, logic 290 is separate from video playback component 280, but in other embodiments logic 290 is combined with video playback component 280.

Decoder module 240 receives the MPEG stream from video playback component 280, then demultiplexes, decrypts and decodes the MPEG packets into a stream of decoded video frames. Display system 230 converts these frames into a video signal for display by a computer monitor or a television. Peripheral I/O interface 220 provides input and output signals, for example, user inputs from a remote control or front panel buttons or a keyboard, and outputs such as LEDs or LCD on the front panel.

As described above, DHCT 160 receives digital television and/or video through IP network 140. In some embodiments, DHCT 160 also receives digital television/video from a head-end system over a hybrid fiber-coax (HFC) transport network (not shown). In these embodiments, DHCT 160 includes a tuner/demodulator (not shown) which processes the digital signals received from the head-end over the HFC connection.

Omitted from FIG. 2 are a number of conventional components, known to those skilled in the art, that are unnecessary to explain the operation of the systems and methods of assembling an elementary stream from an encapsulated multimedia transport stream disclosed herein. A person of ordinary skill in the art should understand that software components referred to herein includes executable code that is packaged, for example, as a standalone executable file, a library, a shared library, a loadable module, a driver, or an assembly, as well as interpreted code that is packaged, for example, as a class.

Figure 3:
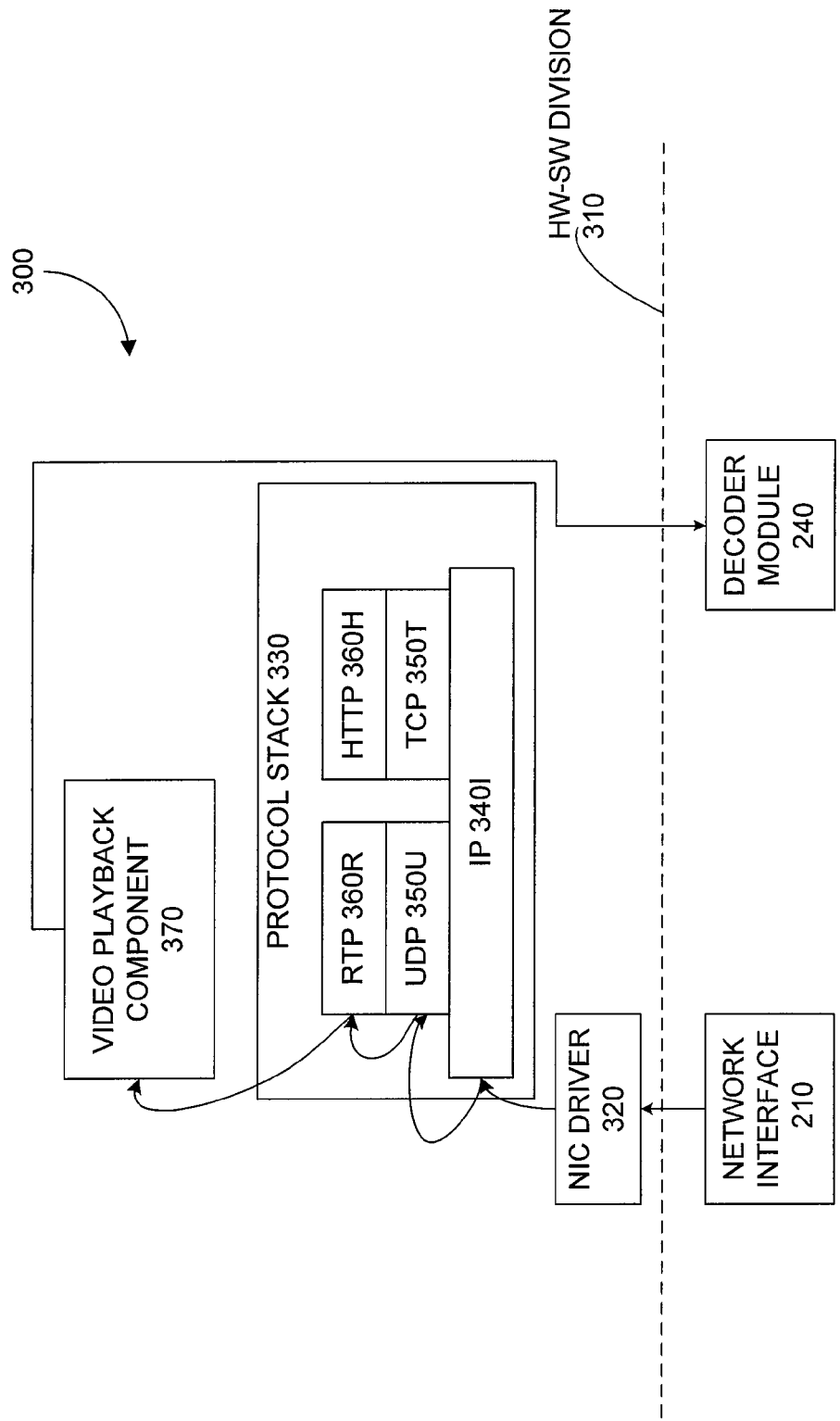
FIG. 3 is a data flow diagram showing how received IPTV packets flow through the various components of a conventional DHCT.

FIG. 3, labeled "PRIOR ART", is a data flow diagram showing how received IPTV packets flow through the various components of a conventional DHCT 300. The division between hardware components and software components is represented by line 310: below line 310 are the hardware components network interface 210 and decoder module 240; above line 310 are software components, which are executed from system memory 260 by processor 250 (see FIG. 2).

Network interface 210 receives packets from local connection 150 which are in a particular layer-1 format, specific to the type of connection (e.g., DSL, twisted-pair Ethernet, etc.). Network interface (NIC) driver 320 is the software component that communicates with the hardware network interface 210. Together, network interface 210 and NIC driver 320 implement layer-2, or the Media Access Control (MAC) layer. Thus, network interface 210 and/or NIC driver 320 remove the layer-2 packet that is encapsulated within the layer-1 frame (i.e., remove a layer-1 header and trailer from the incoming frame).

NIC driver 320 provides incoming layer-2 packets to protocol stack 330. Protocol stack 330 is itself composed of multiple layers, where each layer may consist of more than one protocol. Here, a layer-3 or network layer includes IP (340I), a layer-4 or transport layer includes UDP (350U) and TCP (350T), and a session layer includes RTP (360R) and HTTP (360H). Each layer examines its own layer-specific header and/or trailer, processes the packet accordingly, and passes the packet up to the appropriate protocol above.

The amount of processing varies according to the protocol. Some protocols, such as IP (340I) and UDP (350U), include a checksum in the trailer. These protocols compute a checksum on the received packet and compare the computed checksum with the checksum in the trailer. Only if the checksum matches is the packet passed on to the layer above.

When a particular layer is bound to more than one protocol above it, the layer underneath uses information in the header to determine which upper layer protocol gets the packet. For example, IP (340I) uses a protocol type field in the IP header to determine whether the received packet is forwarded up to UDP (350U) or TCP (350T).

The data rates associated with IPTV are relatively high: a video stream at standard definition TV resolution uses 2-7 Mbits/sec of bandwidth, and a high definition stream uses 14-20 Mbits/sec. At these data rates, the various processing tasks performed by the layers of protocol stack 330 in a conventional set-top design add up to a significant amount of processor time. In addition, each passing of the packet from one layer to another results in a context switch, from one task/thread/process to another. In a conventional set-top, the combination of these factors reduces the amount of time available for video playback application 370, and for any other applications.

Figure 4:
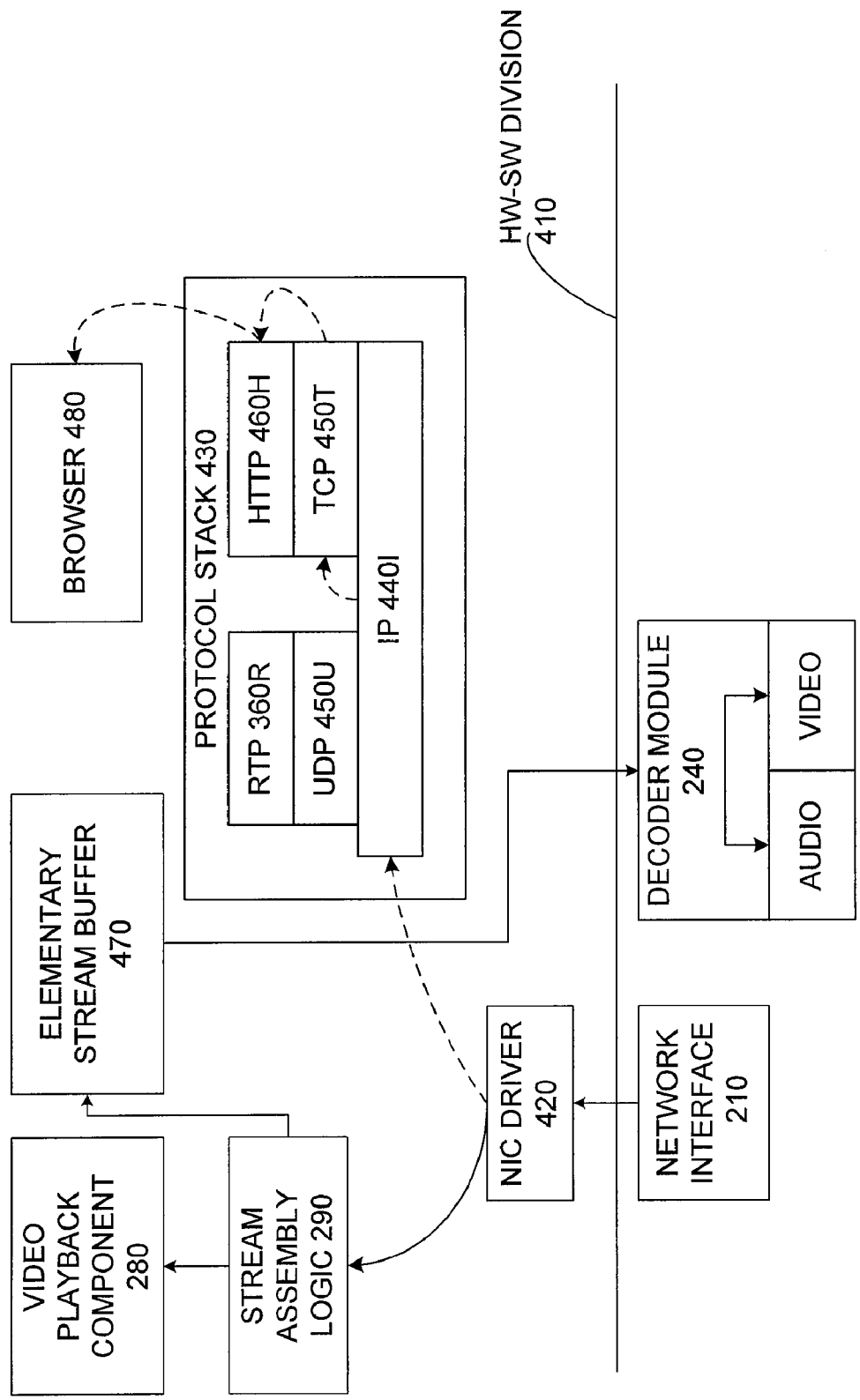
FIG. 4 is a data flow diagram showing how received IPTV packets flow through the various components of the DHCT of FIGS. 1 and 2.

FIG. 4 is a data flow diagram showing how received IPTV packets flow through the various components of the DHCT 160 of FIGS. 1 and 2, which includes stream assembly logic 290. Although DHCT 160 shares some similarities with conventional DHCT 300 in FIG. 3, logic 290 in DHCT 160 reduces the amount of time that the processor spends moving each packet in the IPTV stream from NIC driver 420 to video playback component 280.

The division between hardware components and software components is represented by line 410: below line 410 are the hardware components network interface 210 and decoder module 240; above line 410 are software components, which are executed from system memory 260 by processor 250 (see FIG. 2).

Together, network interface 210 and NIC driver 420 implement layer-2 or the MAC layer, extracting layer-2 packets from the layer-1 packets received on local connection 150. NIC driver 420 provides incoming layer-2 packets to protocol stack 430. Protocol stack 430 is itself composed of multiple layers, where each layer may consist of more than one protocol. The layers and protocols in this example embodiment include network-layer protocol IP (440I), transport-layer protocols UDP (450U) and TCP (450T), and session layer protocols RTP (460R) and HTTP (460H).

Instead of being bound to protocol stack 430, video playback component 280 is bound to stream assembly logic 290, which is in turn bound to NIC driver 420. Stream assembly logic 290 receives a layer-2 packet from NIC driver 420 and removes the MPEG transport stream (TS) packets encapsulated within. The TS packets are assembled in a buffer 470 to produce an MPEG elementary stream usable by video playback component 280 and/or decoder module 240. In the assembly process, some embodiments of stream assembly logic 290 perform filtering on various network and transport layer headers, so that not all packets received by stream assembly logic 290 become part of the assembled elementary stream residing in buffer 470.

In this example embodiment, elementary stream buffer 470 is located in system memory 260. In another embodiment (not shown) buffer 470 is located within decoder module 240, but is accessible by software components (e.g., the buffer has a memory-mapped interface). A person of ordinary skill in the art should understand the various mechanisms which can be used to coordinate software and hardware access to buffer 470 (e.g., mailbox registers, interrupts).

Stream assembly logic 290 notifies video playback component 280 of the arrival of new data in elementary stream buffer 470. Video playback component 280 controls the operation of decoder module 240, instructing decoder module 240 to process TS packets from elementary stream buffer 470.

Decoder module 240 uses the Program Identifiers (PIDs) contained within each TS packet to demultiplex the stream, delivering each TS packet to a decoder that is appropriate for the PID. For example, audio packets are delivered to an audio decoder while video packets are delivered to a video decoder. In some embodiments, decoder module 240 also decrypts the TS packets before decoding.

The details of the packet processing and assembly performed by stream assembly logic 290 will be discussed in more detail below in connection with FIG. 5. However, a person of ordinary skill in the art should recognize from this brief overview that bypassing protocol stack 430 allows stream assembly logic 290 to deliver packets in the IPTV stream to video playback component 280 in an expedited manner, reducing the amount of work done on the packets by processor 250. In contrast, the video playback application 370 of conventional DHCT 300 (see FIG. 3) is coupled to protocol stack 330, so that packets must traverse protocol stack 330 for delivery to video playback application 370.

In one embodiment, DHCT 160 runs a variation of Unix or Linux as an operating system, and stream assembly logic 290 binds to NIC driver 420 using a socket interface. More specifically, in this embodiment stream assembly logic 290 uses the API call socket( ) to create a socket, then setsockopt( ) to set the socket type to SOCK_RAW the protocol to ETH_P_ALL. The socket( ) call is optionally followed by a call to bind( ), specifying the Ethernet address of the NIC hardware 210.

In the embodiments described herein, stream assembly logic 290 receives complete layer-2 packets from NIC driver 420, in which the received packets contain a layer-2 header (e.g., Ethernet destination address, Ethernet source address, and Ethernet frame length). In another variation, stream assembly logic 290 receives layer-3 packets from NIC driver 420, in which the layer-2 header has been removed, so that the first bytes in the received packet are the IP header rather than the Ethernet header. Receiving packets with complete layer-2 headers is known as "raw mode", while "cooked mode" refers to packets in which the layer-2 headers have been stripped. Since stream assembly logic 290 does not need the layer-2 header, either raw or cooked packets will work.

Although video playback component 280 uses stream assembly logic 290 to bypass protocol stack 330, other applications use the services provided by protocol stack 330. NIC driver 420 hands off packets to protocol stack 330, which determines which socket(s) have registered for packet processing, based on the packet type. If the socket has signaled for special processing, the packet is passed off to stream assembly logic 290. Otherwise, the packet is passed to protocol stack 330.

In this example, a browser application 480 binds to protocol stack 330. Browser 480 uses the session protocol HTTP (460H), which in turn relies on TCP (450T) and IP (440I). Thus, applications such as browser 480 may coexist in DHCT 160 with stream assembly logic 290 and video playback component 280. Examples of other co-existing applications are games and text messaging.

Figure 5:
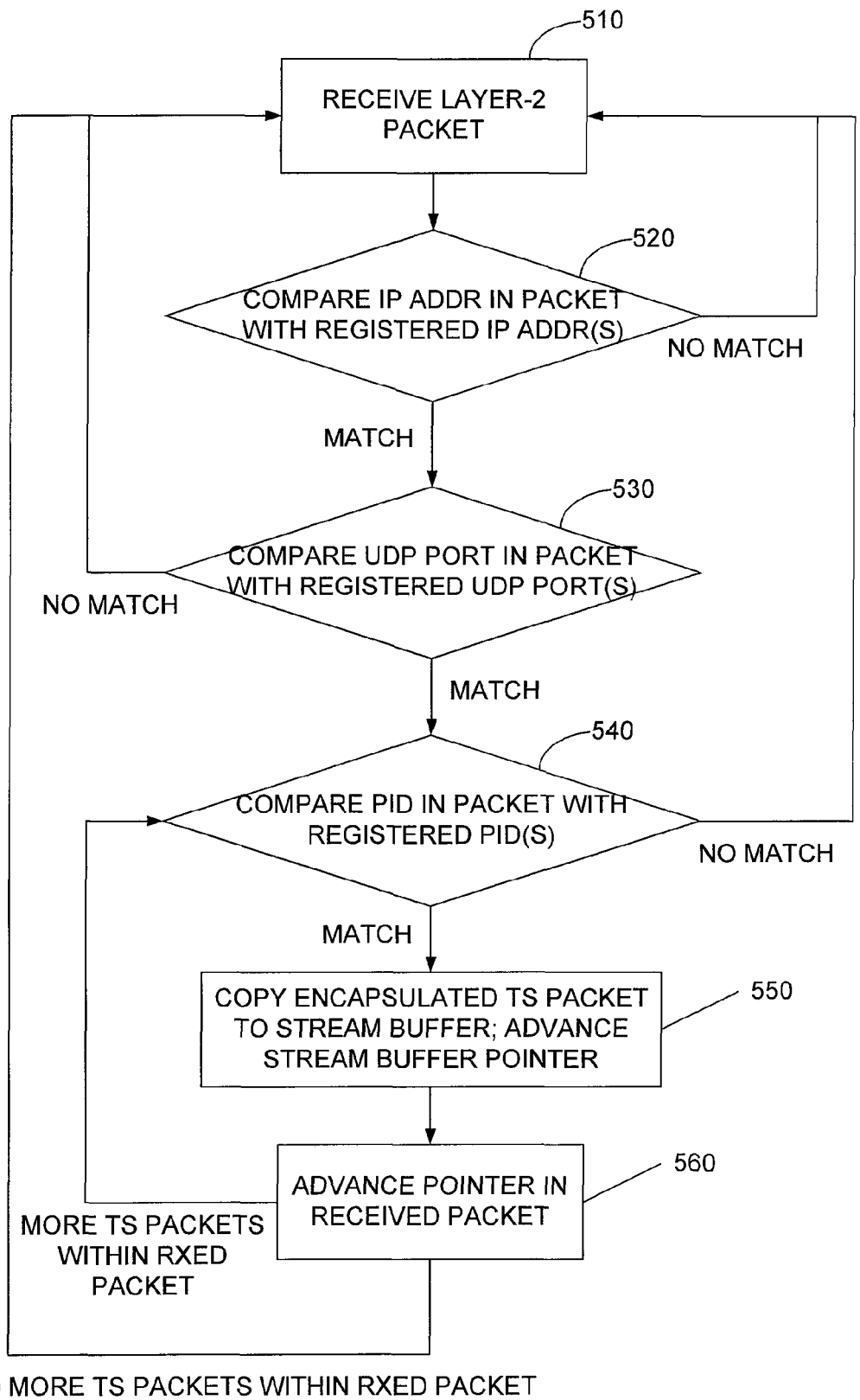
FIG. 5 is a flowchart of stream the assembly logic of FIGS. 2 and 4.

FIG. 5 is a flowchart of stream assembly logic 290. Processing begins at block 510, where a layer-2 (e.g., Ethernet) packet is received. Next, at block 520, the destination IP address in the IP header of the received packet is compared to one or more IP addresses which video playback component 280 has registered with stream assembly logic 290. In a typical IPTV environment, the destination IP address will be a multicast address.

If the destination IP address does not match, processing of this packet is finished, and control returns to block 510 to wait on the arrival of the next packet. If a match on the destination IP address is found, then processing of the received packet continues at block 530, where the destination port in the UDP header of the packet is compared to one or more UDP ports which video playback component 280 has registered with stream assembly logic 290.

If the destination UDP port does not match, processing of this packet is finished, and control returns to block 510 to wait on the arrival of the next packet. If a match on the destination IP address is found, then processing of the received packet continues at block 540, where the Packet Identifier (PID) in the MPEG Transport Stream (TS) packet header is compared to one or more PIDs which video playback component 280 has registered with stream assembly logic 290.

If the PID matches, then the MPEG TS packet is copied (block 550) to the next location in stream buffer 470, and the stream buffer pointer is advanced. Then a receive packet pointer or index is advanced (block 560) to address the next TS packet in the received layer-2 packet. If the last TS packet has been processed, then processing of this packet is complete, and control returns to block 510. Otherwise, the PID comparison of block 540 is repeated using the PID in the next TS packet header.

A person of ordinary skill in the art should understand the structure and layout of IP, UDP, and MPEG TS packets and headers, so offsets within headers and header/packet lengths will not be discussed here. The comparison of header fields to registered values described above can be viewed as applying filters to the received layer-2 packet. Such a person should also realize that these filters may be applied singly, or in combination, and that other such filters, using other fields, are also possible. Thus, various embodiments of stream assembly logic 290 using different packet filters are contemplated.

A person of ordinary skill in the art should further understand the mechanism which video playback component 280 uses to register an IP multicast address or an Ethernet multicast address with stream assembly logic 290, for example, using socket options. Such a person should understand how IP multicast addresses are mapped to Ethernet multicast addresses, as specified in the RFC 1112 standard.

In the embodiments described above, stream assembly logic 290 does not perform a checksum on the IP packet encapsulated in the received layer-2 packet, or on the UDP packet encapsulated in the IP packet. Although a checksum is important in some environments, it is less important for IPTV: a stream containing corrupted video frames can be nonetheless be decoded, and even if the viewer sees artifacts, this may be acceptable to the viewer. However, in alternative embodiments, stream assembly logic 290 computes one or more checksums on the received layer-2 packet, for example, an IP checksum or a UDP checksum. In one of these alternative embodiments, the checksum is computed in hardware, for example, by a field programmable gate array (FPGA) or application-specific integrated circuit (ASIC).

Figure 6:
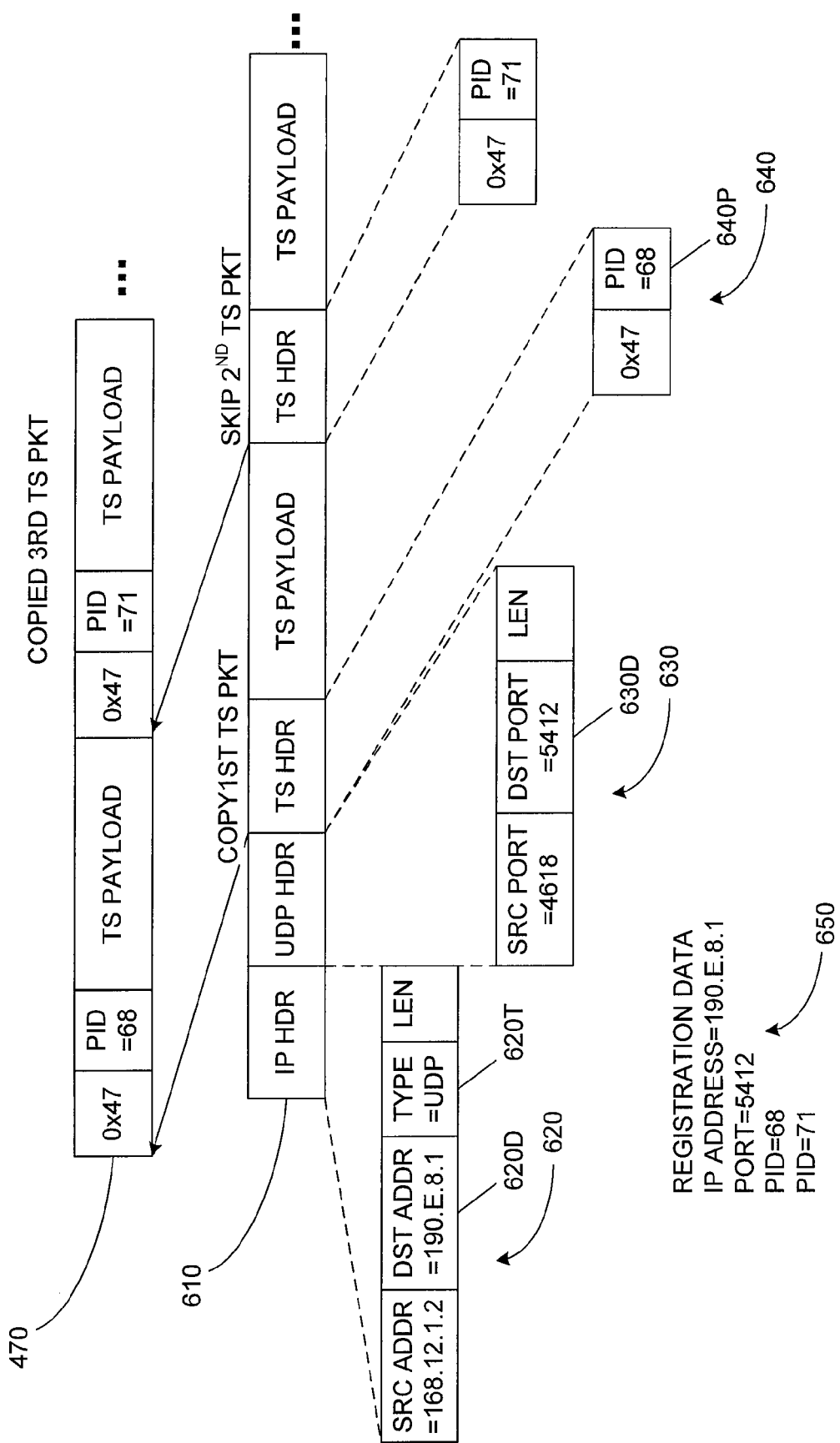
FIG. 6 is a data flow diagram showing an example scenario of the assembly of an elementary stream by stream assembly logic.

FIG. 6 is a data flow diagram showing the assembly of an elementary stream by stream assembly logic 290 in an example scenario. Stream assembly logic 290 receives an IPTV packet 610 from NIC driver 420. Packet 610 includes an IP header 620, a UDP header 630, and an MPEG Transport Stream (TS) header 640, encapsulated as shown in FIG. 6. The headers depicted in FIG. 6 have been simplified, and therefore contain only a subset of the actual header fields. Furthermore, the fields in FIG. 6 may appear in a different order than in an actual header. In this embodiment, packet 610 is a "cooked" packet, which means the layer-2 header has already been removed, but a person of ordinary skill in the art should understand how a "raw" layer-2 packet is handled by adjusting packet layout and offsets as appropriate.

IP header 620 is composed of various fields, including a destination address 620D, and a protocol type 620T. Stream assembly logic 290 examines the contents of destination address 620D, and compares the packet address to one or more IP addresses registered by a component such as video playback component 280. In this example scenario, the value of destination address 620D is "190.E.8.1", which does match one of the IP addresses contained in registration data 650.

Since an IP address match was found, stream assembly logic 290 continues filtering packet 610 by examining protocol type 620T. In this embodiment, UDP is used as a transport layer for IPTV packets, so protocol type 620T is compared to the fixed value which represents the UDP protocol type. In this scenario, the value of protocol type 620T matches the UDP type, so filtering continues.

The next encapsulated header, UDP header 630, is examined by stream assembly logic 290. UDP header 630 contains various fields, including a destination port 630D. Stream assembly logic 290 examines the contents of destination port 630D, and compares the port to one or more UDP ports registered by video playback component 280. In this example, the value of destination port 630D is 5412, which does match one of the UDP ports contained in registration data 650.

Now that stream assembly logic 290 has determined that packet 610 contains an IP address and a UDP port of interest, the MPEG TS packets encapsulated within packet 610 will be examined. Those TS packets containing a Program ID (PID) of interest will be copied to elementary stream buffer 470, as described below.

Stream assembly logic 290 examines TS header 640, which is composed of various fields, including a Program Identifier (PID) 640P. Stream assembly logic 290 examines the contents of PID 640P, and compares the PID to one or more PIDs registered by video playback component 280. In this scenario, the value of PID 640P is 68, which does match one of the PIDs in registration data 650.

Since the first PID in packet 610 matches, the entire TS packet (header and payload) identified by this PID is copied to elementary stream buffer 470. MPEG-2 TS packet are fixed-length, but another embodiment uses a length field in the TS header to copy variable length TS packets. Stream assembly logic 290 updates buffer pointers as appropriate, for example, advancing an address or index into elementary stream buffer 470 and another address/index into packet 610.

Stream assembly logic 290 iterates through all TS packets encapsulated within packet 610, copying to elementary stream buffer 470 when the TS packet has a matching PID. A person of ordinary skill in the art should understand how length fields in IP header 620 and/or UDP header 630 are used to determine when all TS packets within packet 610 have been processed.

In this example, the second TS packet has a PID of 42, which is not included in registration data 650. Therefore, the second TS packet is not copied. 470. However, in this example a third TS packet (not shown) has a PID of 71, which matches registration data 650, so this third TS packet is copied to elementary stream buffer 470.

Any process descriptions or blocks in flowcharts should be understood as representing modules, segments, or portions of code which include one or more executable instructions for implementing specific logical functions or steps in the process. As would be understood by those of ordinary skill in the art of the software development, alternate implementations are also included within the scope of the disclosure. In these alternate implementations, functions may be executed out of order from that shown or discussed, including substantially concurrently or in reverse order, depending on the functionality involved.

The systems and methods disclosed herein can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) an optical fiber and a portable compact disk read-only memory (CD-ROM).

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable a person of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

We claim:

1. A method, performed in a digital home communication terminal (DHCT), of assembling a multimedia transport IPTV stream, the method comprising the steps of:
receiving a media access control layer (MAC) layer packet through a binding to a MAC-layer network interface driver, the MAC-layer packet containing one or more multimedia transport packets;
applying at least one criteria filter to the received MAC-layer packet to determine whether the one or more multimedia transport packets contained within the received MAC-layer packet meets criteria associated with the criteria filter;
applying a PID filter to the received MAC-layer packet to determine whether the received packet contains one or more multimedia transport packets having a PID field matching at least one PID value stored by a user as a preferred PID in a registration data table, wherein the registration data table comprises both the criteria and user-stored PID preferences previously registered by a stream assembly logic;
for each multimedia transport packet meeting the applied criteria filter criteria and matching the PID filter, copying the respective multimedia transport packet to an elementary stream buffer; and
for each multimedia transport packet not meeting the applied criteria filter criteria or not matching the PID filter, copying the respective multimedia transport packet to a protocol stack.

2. The method of claim 1, further comprising the step of:
notifying an application of new data in the elementary stream buffer.

3. The method of claim 1, wherein the criteria comprises at least one of an IP address, a UDP port, or a multimedia transport program identifier.

4. The method of claim 1, wherein the applying step further comprises:
comparing an IP destination address in the received MAC-layer packet with at least one registered IP address.

5. The method of claim 1, wherein the applying step further comprises:
comparing a UDP destination port in the received MAC-layer packet with at least one registered UDP port.

6. The method of claim 1, wherein the applying step further comprises:
comparing a PID in the received MAC-layer packet with at least one registered PID.

7. The method of claim 1, further comprising:
updating a current position associated with the elementary stream buffer.

8. A digital home communication terminal (DHCT) comprising:
a network interface;
memory having stored thereon program code; and
a processor that is programmed by at least the program code to enable the DHCT to:
receive a layer-2 packet through a binding to a network interface driver, the network interface driver in communication with the network interface, the layer-2 packet containing one or more multimedia transport packets;
apply at least one criteria filter to the received packet to determine whether the one or more multimedia transport packets contained within the received packet meets criteria associated with the criteria filter;
applying a PID filter to the received packet to determine whether the received packet contains one or more multimedia transport packets having a PID field matching at least one PID value stored by a user as a preferred PID in a registration data table, wherein the registration data table comprises both the criteria and user-stored PID preferences;
for each multimedia transport packet meeting the applied criteria filter criteria and matching the PID filter, copy the respective multimedia transport packet to an elementary stream buffer; and
for each multimedia transport packet not meeting the applied criteria filter criteria or not matching the PID filter, copying the respective multimedia transport packet to a protocol stack.

9. The DHCT of claim 8, wherein the criteria comprises at least one of an IP address, a UDP port, or a multimedia transport program identifier.

10. The DHCT of claim 8, wherein the processor is further programmed to enable the DHCT to:
receive a registration request for the at least one filter, the registration request comprising the specified criteria.

11. The DHCT of claim 8, wherein the processor is further programmed to enable the DHCT to:
compare an IP destination address in the received layer-2 packet with at least one registered IP address.

12. The DHCT of claim 8, wherein the processor is further programmed to enable the DHCT to:
compare a UDP destination port in the received layer-2 packet with at least one registered UDP port.

13. The DHCT of claim 8, wherein the processor is further programmed to enable the DHCT to:
compare a PID in the received layer-2 packet with at least one registered PID.

14. A digital home communication terminal (DHCT) comprising:
a processor containing logic in memory configured to receive a layer-2 packet through a binding to a network interface driver;
the processor further containing logic configured to apply at least one criteria filter to the received packet to determine whether the received packet contains one or more multimedia transport packets meeting criteria associated with the criteria filter;
applying a PID filter to the received packet to determine whether the received packet contains one or more multimedia transport packets having a PID field matching at least one PID value stored by a user as a preferred PID in a registration data table, wherein the registration data table comprises both the criteria and user-stored PID preferences;
the processor further containing logic configured to, for each multimedia transport packet meeting the applied criteria filter criteria and matching the PID filter, copy the respective multimedia transport packet to an elementary stream buffer; and
the processor further configured to, for each multimedia transport packet not meeting the applied criteria filter criteria or not matching the PID filter, copying the respective multimedia transport packet to a protocol stack.

15. The DHCT of claim 14, wherein the processor is further programmed to enable the DHCT to:
compare an IP destination address in the received layer-2 packet with at least one registered IP address.

16. The DHCT of claim 14, wherein the processor is further programmed to enable the DHCT to:
compare a UDP destination port in the received layer-2 packet with at least one registered UDP port.

17. The method of claim 1, wherein the receiving occurs outside of an IP protocol stack.

* * * * *